March 19, 1957

J. F. SELLERS ET AL 2,786,155

UNIPOLAR DYNAMOELECTRIC MACHINE
WITH SLEEVE MOUNTED FIELD COIL

Filed Sept. 25, 1953

Inventors
John F. Sellers
Edward F. Brill
by T. Lloyd La Fave
Attorney

United States Patent Office 2,786,155
Patented Mar. 19, 1957

2,786,155

UNIPOLAR DYNAMOELECTRIC MACHINE WITH SLEEVE MOUNTED FIELD COIL

John F. Sellers, Granville, and Edward F. Brill, Brookfield, Wis., assignors to Allis-Chalmers Manufacturing Company, Milwaukee, Wis.

Application September 25, 1953, Serial No. 382,376

7 Claims. (Cl. 310—178)

This invention relates to an improved unipolar dynamoelectric machine of the type employing liquid brushes or collectors.

This unipolar machine may be operated as a generator or as a motor and comprises a cylinder of electrically conductive magnetic material rotated in a uniform radial magnetic field which produces a voltage gradient axially of the cylinder. Output bus bars are suitably connected to the armature or cylinder through suitable fluid collectors. This is a relatively low voltage high current machine.

According to the present invention a stationary tubular member or sleeve surrounds the cylinder for confining collector fluid and an inert gas therebetween and serves as the armature current conductor providing armature reaction compensation and also serving as the pole pieces for the field structure. The field coil is removably secured in a cooperating yoke without disturbing the sleeve, and the coil may be removed without exposing the collector fluid to atmosphere. The cylinder is also constructed so that rotation thereof causes self-pumping of the collector fluid through a cooler external of the machine, and causes the fluid to be confined within a predetermined area such as the collector region thereof.

It is therefore an object of the present invention to provide a unipolar dynamoelectric machine having a fluid collector and a field coil which can be replaced without exposing the collector fluid to atmosphere.

Another object of the invention is to provide a fluid collector type unipolar dynamoelectric machine which is economical to make and easy to assemble.

Another object of the present invention is to provide in a unipolar dynamoelectric machine self-pumping of the collector fluid to an external cooler.

Another object of the invention is to provide multiple field units for a compensated unipolar machine with a rotating armature providing a single current path therein.

Figure 1:
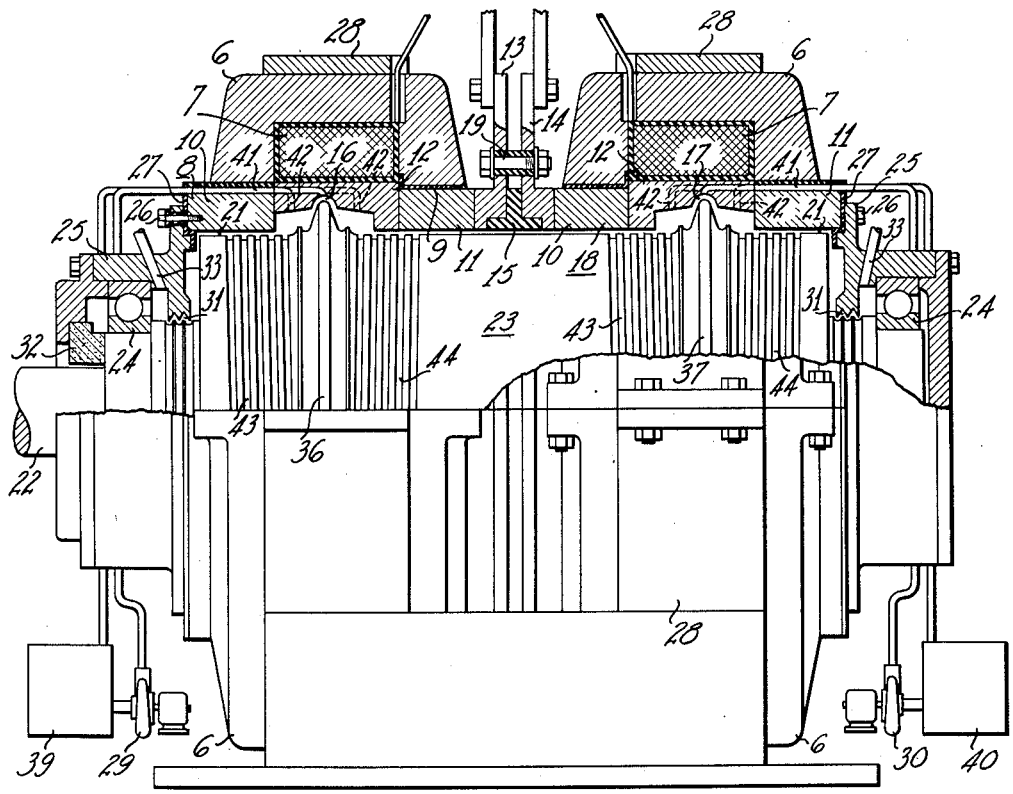
Figure 2:
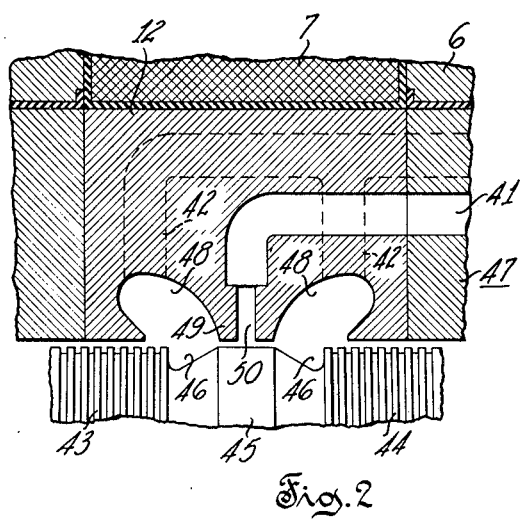

Other objects of the invention may be apparent upon reading the following description with the accompanying drawings, in which:

Fig. 1 is a view partly in elevation and partly in section showing a unipolar dynamoelectric machine embodying the present invention; and Fig. 2 is a view of a modification of the current collector portion of the machine shown in Fig. 1.

Referring to the drawing, the unipolar dynamoelectric machine shown in Fig. 1 comprises a stationary field structure and a rotating armature. The field structure comprises two similar units each including an annular U-shaped yoke 6 having a ring field coil 7 disposed in the recessed portion of the yoke. The yoke and coil are mounted concentrically of a relatively thick walled sleeve 8 and insulated therefrom by suitable insulation 9 disposed therebetween.

The sleeve has end portions 10, 11 of magnetic material such as iron radially aligned with the yoke and an intermediate or brush portion 12 which is of nonmagnetic conductive material such as stainless steel. The magnetic portions of the sleeve serve as the poles for the field structure and are made integral with the brush portion as by welding. The sleeve serves as a current carrying member.

An annular plate 13 integral with an end of the sleeve serves as a bus ring therefor. The bus rings 13, 14 for both field structures are disposed between the field structures and are spaced by a ring of insulation 15. The ring of insulation is of T-shaped cross section and cooperates with the two sleeves 8, 18 in joining them as a continuous sleeve. The two plates or bus rings 13, 14 are rigidly secured together in insulated relation by bolts 19 insulated from one of the bus rings. This arrangement of the bus rings exposes them for convection cooling.

A rotatable armature is disposed within the sleeves 8, 18 and defines air gaps 21 therebetween. The armature or rotor comprises a shaft 22 including a cylinder 23 of magnetic material such as iron for the passage of field flux therein. The shaft is supported at opposite ends of the rotor in suitable bearings 24. The bearings comprise flanged annular housings or brackets 25 with the flanged portions rigidly secured to the ends of the sleeves 8, 18 such as by bolts 26 insulated from the housing. A gasket 27 of insulating material is disposed between the flange of the bearing bracket and the ends of the sleeve to seal and insulate the bearing from the sleeve which carries armature current.

The bearing bracket and shaft define a labyrinth passage 31 adjacent the armature to prevent collector fluid entering the bearing. A suitable gas tight seal 32 is also provided with each bearing and may be located on either side thereof. Means comprising a tapped hole 33 is provided in the bearing bracket to conduct a gas such as nitrogen or helium under pressure to the bearing cavity to prevent fluid metal from entering the bearing.

The rotor has spaced apart rings 36, 37 which are radially aligned with annular grooves 16, 17, the brush portions 12 of the sleeves. The rotor rings and the brush portions of the sleeve are wetted by a conductive fluid such as a sodium-potassium alloy which fills the gap therebetween. The rotor rings 36, 37 and the annular grooves 16, 17 serve as current collectors conducting armature current between the stationary and rotating members. The air gap surfaces of the rotor or of the sleeves, preferably of the sleeves, except at the collector area, are insulated by a suitable coating or lining such as of glass, rubber or varnish which is not chemically reactive with the collector fluid.

The radially extending rotor rings if made integral with the rotor as shown in Fig. 1, require that the stationary surrounding members be split axially into circumferential sections for assembly. Sleeves 8, 18, are therefore made in half sections to assemble about the rotor and rotor ring. Suitable gaskets, preferably of copper, are disposed between the sections of each sleeve. When the bus rings 13, 14 are bolted together and when the bearing housings 25 are bolted to the ends of the sleeves, the rotor is completely enclosed and the parting lines of the sleeves are sealed gas tight.

The field coils are each slipped on one of the sleeves. The U-shaped stator yoke 6, which is split axially into flanged sections for assembly, is then placed about the coil and the sleeve. The yoke sections are bolted together. Thus, the yoke and coil are removable without disturbing the sleeve or housing, and without exposing the collector fluid to atmosphere. Annular split clamps 28 are secured about the central portions of the yokes to rigidly secure the machine in a suitable bed plate.

Means for cooling the collectors may comprise the rotor rings 36, 37 which rotate the collector fluid in the annular grooves of the collectors. Although the brush portion 12 of each sleeve may be cooled by a cooling fluid circulated through suitable ducts therein, it is preferably cooled by the collector fluid itself which is circulated through external coolers 39, 40 and returned to the machine. The collectors have separate external coolers which are insulated from each other.

An inlet duct 41 extends through each sleeve to supply collector fluid to the collector gap from its associated cooler, 39 or 40, disposed outside of the machine housing. An inlet duct 41 opens radially opposite a rotor ring 36 or 37. Discharge ducts 42 in the sleeves open in the collector gap on opposite sides of each of the rotor rings 36, 37. These ducts return the collector fluid to the cooler. The collector fluid may be circulated by any suitable means such as a pump 29 or 30 and by self-pumping means comprising the armature cylinder 23. The armature cylinder has helical grooves 43, 44 in its surface adjacent the rotor rings. The grooves 43 on one side of a ring are threaded oppositely to the grooves 44 on the other side so that a predetermined direction of rotation of the armature causes the collector fluid to be forced axially toward the rotor ring from opposite sides thereof, thus keeping the fluid at the collector and away from the bearings. The helically grooved or threaded portions of the armature cylinder besides effecting pumping of the collector fluid to the collector cooperates with the external pumps to keep the rotor rings and brush portions of the sleeves immersed in collector fluid.

At stand still the collector fluid rests at the bottom of the collector which is designed with sufficient space so that collector fluid does not rise above the air gap. A suitable source of direct current, not shown, is connected to the field coils to energize the coils to produce uniform radial magnetic field in the air gap. The adjacent field poles of the independent field structures have the same polarity. The shaft is rotated by suitable known means and the rotor rings force the collector fluid to distribute itself circumferentially about the collector. Voltage is generated in the armature causing armature current to flow in series circuit from one bus such as 14, through one collector to the armature and through the armature to the other collector to the other bus 13, and then back to bus 14.

The flow of the current in the sleeves is in an axial direction and is opposite the direction of flow of the current in the armature. The cross flux produced by the current in the sleeves cancels the cross flux produced by the current in the armature thereby keeping the losses to a minimum. The two collectors connect the armatures for the two fields in series; the voltages generated are in series relation and therefore double voltage is obtained. This voltage is insulated from the yoke by the insulation between the yoke and sleeve. Armature current therefore cannot be shunted by the exposed yoke and the yoke may be grounded for safety of the operators. Insulation between the bearing housing and the sleeve also isolates the bearing from armature voltage and current.

In the modification shown in Fig. 2, the armature cylinder comprises a rotor ring 45 which does not extend beyond the general outer diameter of the rotor but has substantially the same diameter. Radial grooves 46 are provided in the cylinder on each side of the rotor ring and adjacent these grooves the armature cylinder has helical grooves 43, 44 to provide self-pumping of the collector fluid. A sleeve 47 surrounds the armature cylinder to define an air gap therebetween, and like sleeves 8, 18, has a central or brush portion 12 of nonmagnetic material cooperating with the rotor ring and liquid metal to operate as a current collector. Annular grooves 48 in the brush portion 12 of the sleeve define a stationary ring 49 therebetween aligned with the rotor ring 45. This ring has an annular radial slot 50 therein. Discharge ducts 42 open into the gap in grooves 48 and an inlet duct 41 opens into the slot 50 in ring 49.

This construction and arrangement of the collector provides efficient pumping of the collector fluid and proper wetting of the collector by the liquid metal. It also permits sleeve 47 to be made in one piece and slipped axially over the rotor for assembly.

Other variations or modifications may be made in the embodiment of the invention shown by one skilled in the art without departing from the spirit of the invention or from the scope of the appended claims.

It is claimed and desired to secure by Letters Patent:

1. A unipolar dynamoelectric machine comprising a rotatable armature, two axially spaced field members cooperating with the armature; each field member comprising an annular U-shaped stator yoke provided with an annular field coil and a conducting sleeve disposed within said yoke, said sleeve surrounding said armature and defining an air gap therewith, said sleeve extending axially across said yoke and having portions of magnetic material radially aligned with both of the legs of the associated yoke to define the field poles thereof, the intermediate portion of said sleeve being of nonmagnetic material and having an annular groove therein; the adjacent ends of the sleeves of said field members defining terminals for said machine, a ring of insulation between said sleeves cooperate therewith to enclose said armature and insulation between said sleeves and said yokes, an electrically conductive fluid in said gap intermediate the poles of each said field member, said fluid wetting said armature and said annular groove for conducting current between said armature and said sleeve, and means for energizing said field coils to maintain a magnetic field across the gap.

2. A unipolar dynamoelectric machine comprising a rotatable armature, a stationary field member cooperating with said armature, said field member comprising an annular field coil, an electrically conductive sleeve enclosing said armature and defining an air gap therebetween, the outer periphery of said sleeve designed to permit axial insertion or removal of said field coil on said sleeve without disturbing the assembly of said sleeve, an annular yoke removably disposed about said field coil and said sleeve with said sleeve extending axially across said yoke, the portions of said sleeve being of ferromagnetic material and radially aligned with portions of said yoke to serve as the field poles thereof, insulation disposed between said aligned portions of said sleeve and yoke, the intermediate portion of said sleeve between said poles being of nonmagnetic material, a ring bus integral to an end of said sleeve, said ring bus and said magnetic and nonmagnetic portions of said sleeve being integral with each other, an annular groove in said intermedate portion of said sleeve, an electrically conductive fluid in said gap, said annular groove forming a collector for said conductive fluid wetting both said sleeve and said armature for conducting armature current therebetween, means energizing said field coil, whereby said sleeve serves as part of said field member and as a conductor for said armature current between said collector and said ring bus.

3. A unipolar dynamoelectric machine comprising a rotatable armature and a stationary field member, said armature comprising a cylinder, said field member comprising a sleeve surrounding said cylinder to define an air gap therebetween, a collector comprising an annular groove in said sleeve, conductive fluid filling said collector portion of the gap for conducting current between the sleeve and the cylinder, and helical grooves in the outer surface of said cylinder on each side of the collector portion to force the fluid to the collector portion of the gap when said cylinder is rotated in a predetermined direction.

4. A unipolar dynamoelectric machine comprising a rotatable armature and a stationary field member, said armature comprising a cylinder, said field member comprising a sleeve surrounding said cylinder to define an air gap therebetween, a collector comprising an annular groove in said sleeve, conductive fluid filling said collector in contact with the sleeve for conducting current between the sleeve and the cylinder, an external cooler for the conductive fluid of one said collector, an inlet duct in said sleeve supplying the conductive fluid to said one current collector portion of the gap from said cooler, an outlet duct in said sleeve returning fluid from said gap to said cooler, means comprising helical grooves in said cylinder acting as a circulating pump forcing the fluid to the collector and to discharge through said outlet ducts and to circulate between said cooler and said one collector portion of said gap.

5. A unipolar dynamoelectric machine comprising a rotatable armature and stationary field members, said armature comprising a cylinder, said field members comprising axially spaced steel sleeves surrounding said cylinder to define an air gap between said sleeves and said cylinder, each said steel sleeve including portions of magnetic steel serving as poles for said field member and an intermediate portion of nonmagnetic steel integral with said magnetic portions, a collector comprising an annular groove in said nonmagnetic portion of each said sleeve, conductive fluid filling collector portions of the gap under both said sleeves for conducting current between the sleeves and the cylinder, a first and second cooler disposed externally of said machine and insulated from each other, an inlet duct in a first said sleeve to supply conductive fluid to one collector portion of said gap from said first cooler, an outlet duct in said first sleeve returning fluid from said gap to said first cooler, an inlet duct in the second said sleeve to supply conductive fluid to said second collector portion of said gap from said second cooler, an outlet duct in said second sleeve returning fluid from said gap to said second cooler, helical grooves in said cylinder on each side of the collector portions, to force the fluid to the adjacent collector portions of the gap, to discharge through the outlet ducts and to circulate between said first cooler and the collector portion of said first sleeve and to circulate between said second cooler and said collector portion of said second sleeve.

6. A unipolar dynamoelectric machine comprising a rotatable armature, a stationary field member cooperating with said armature, said field member comprising an annular field coil, an electrically conductive sleeve enclosing said armature and defining an air gap therebetween, an electrically conductive fluid in said gap, said sleeve having a cylindrical outer surface to permit axial insertion or removal of said field coil on said sleeve without disturbing said sleeve and without exposing said fluid to atmosphere, an annular yoke removably disposed about said field coil and said sleeve with said sleeve extending axially across said yoke, portions of said sleeve being of ferromagnetic material and radially aligned with portions of said yoke to serve as the field poles thereof, the intermediate portion of said sleeve being of nonmagnetic material, a ring bus integral to an end of said sleeve, said ring bus and said magnetic and nonmagnetic portions of said sleeve being integral with each other, an annular groove in said intermediate portion of said sleeve, said annular groove forming a collector for said fluid, said fluid wetting both said sleeve and said armature for conducting armature current therebetween, means energizing said field coil, whereby said sleeve serves both as part of said field member and as a conductor for said armature current between said collector and said ring bus.

7. A unipolar dynamoelectric machine comprising a rotatable armature, a stationary field member cooperating with said armature, said field member comprising an annular field coil, an electrically conductive steel sleeve enclosing said armature and defining an air gap therebetween, an electrically conductive fluid in said gap, said sleeve permitting axial insertion or removal of said field coil on said sleeve without disturbing said sleeve and without exposing said fluid to atmosphere, an annular yoke removably disposed about said field coil and said sleeve with said sleeve extending axially across said yoke, portions of said sleeve being of ferro-magnetic steel and radially aligned with portions of said yoke to serve as the field poles thereof, the intermediate portion of said sleeve being of nonmagnetic steel, a ring bus integral to an end of said sleeve, said ring bus and said magnetic and nonmagnetic portions of said sleeve being integral with each other, an annular groove in said nonmagnetic steel portion of said sleeve, said annular groove forming a collector for said fluid, said fluid wetting both said sleeve and said armature for conducting armature current therebetween, means energizing said field coil, whereby said sleeve serves both as part of said field member and as a conductor for said armature current between said collector and said ring bus.

References Cited in the file of this patent

UNITED STATES PATENTS

| | | |
|---|---|---|
| 1,635,319 | Gill | July 12, 1927 |
| 1,916,256 | Chandeysson | July 4, 1933 |
| 2,121,593 | Hague | June 21, 1938 |
| 2,401,166 | Kobel | May 28, 1946 |

FOREIGN PATENTS

| | | |
|---|---|---|
| 225,644 | Switzerland | May 17, 1943 |